United States Patent [19]
Severino et al.

[11] Patent Number: 6,108,180
[45] Date of Patent: Aug. 22, 2000

[54] MULTI-GROUNDED NEUTRAL ELECTRICAL ISOLATION BETWEEN UTILITY SECONDARY LOW-VOLTAGE POWER SERVICE AND HIGH-VOLTAGE TRANSMISSION STRUCTURES

[75] Inventors: Juan L. Severino; Bruce E. Wilson; Randall K. Hamilton, all of Tucson, Ariz.

[73] Assignee: Wilson, Hamilton & Severino Engineers, LLC, Tucson, Ariz.

[21] Appl. No.: 09/261,733

[22] Filed: Mar. 3, 1999

[51] Int. Cl.[7] ........................................ H02H 9/08
[52] U.S. Cl. .............................. 361/42; 361/43; 361/118; 361/119
[58] Field of Search ............................... 361/42, 43, 118, 361/119

[56] References Cited

U.S. PATENT DOCUMENTS

| | | | |
|---|---|---|---|
| 3,932,804 | 1/1976 | Allen | 323/356 |
| 4,573,098 | 2/1986 | Williston | 361/42 |

*Primary Examiner*—Michael J. Sherry
*Attorney, Agent, or Firm*—Antonio R. Durando

[57] ABSTRACT

A multi-grounded neutral electrical isolation system for a personal-communication-system cell site consists of two standard distribution transformers separated by a distance greater than the zone of influence corresponding to the maximum expected ground potential rise at the PCS cell site. The primary winding of the first transformer is connected to the utility's low-voltage distribution system and is grounded through the network's ground. The secondary winding is connected to the primary winding of the second transformer through a high-voltage non-shielded insulated conductor and the frames of the two transformers are kept electrically isolated. The secondary winding of the second transformer energizes the PCS cell site and shares its ground connection, which is also common to the adjacent high-voltage transmission tower. All neutrals are grounded through their respective grounding systems. The second transformer is selected with a basic-insulation-level rating sufficient to withstand the maximum ground potential rise expected to occur at the cell site as a result of a fault or a lightening discharge at the high-voltage transmission tower. By separating the two transformers by a distance at least equal to the zone of influence corresponding to such a GPR, the isolation of the distribution grid from the cell site is ensured. Moreover, the BIL rating of the transformers protects the transmission grid from a sudden potential rise due to a fault in the transformer's insulation.

20 Claims, 3 Drawing Sheets

ONE LINE DIAGRAM

ONE LINE DIAGRAM

CONNECTION DIAGRAM

MULTI-GROUNDED NEUTRAL ELECTRICAL ISOLATION BETWEEN UTILITY SECONDARY LOW-VOLTAGE POWER SERVICE AND HIGH-VOLTAGE TRANSMISSION STRUCTURES

BACKGROUND OF THE INVENTION

1. Field of the Invention

This invention pertains to the general field of multi-grounded neutral (MGN) electrical isolation circuits. In particular, it provides ground isolation between personal-communication-system (PCS) cell sites located on high-voltage transmission structures and the multi-grounded neutral system of a local electric utility's secondary low-voltage power service energizing the sites.

2. Description of the Prior Art

PCS cell sites typically require an antenna reaching 15 to 45 meters high from ground level and regulatory impediments often prevent the erection of support structures for such antennae in populated areas. Therefore, PCS cell sites are typically placed adjacent to high-voltage transmission towers which provide an existing, readily available structure for such antenna requirements. Power from the local electric utility's secondary low-voltage power service is then routed to the cell site to energize its operating components.

As in the case of all equipment connected to a utility power grid, current PCS cell-site state of the art practice is to achieve a low cell-site ground resistance by connecting it to the multi-grounded neutral of the public electric utility system. Typically such multi-grounded neutral is connected extensively to earth and is characterized by low impedance to remote earth, such as 2–5 Ohms.

As illustrated in FIG. 1, usually power is supplied from a medium-voltage transmission structure 10 to PCS cell-site equipment 12 through a transformer 14. This transformer reduces the voltage available from the network to the level required by consumers and feeds the cell site through a meter 16 and service-entrance equipment 18. As mentioned, the antenna of the cell site (not shown in the drawings) is commonly mounted on a high-voltage transmission tower 20 for convenience or necessity. Because of the resulting unavoidable proximity of the cell site 12 to the tower 20, the two are connected to ground through a common ground line 22. In addition, as illustrated by the connections shown in the diagram of the service-entrance equipment 18, the neutral lines 24 of the network are also connected to the same ground line. Thus, a common ground exist between the high-voltage transmission tower, the PCS cell-site equipment neutral, the transformer neutral, and the service entrance neutral. That is, a common ground exists for the whole system of power transmission and use.

Because of this grounding configuration, as is clearly understood by one skilled in the art, a ground potential rise (GPR) experienced at the site of the tower 20 as a result of a power system fault or lightening strike would be transferred directly to the consumers' grounding systems through the common neutral network. Thus, the current practice of connecting cell sites adjacent to high-voltage towers to the utility distribution system with a common multi-grounded neutral extends the zone of influence of a ground potential rise occurring at any such tower for a considerable distance along the power neutral that feeds the PCS cell site. This can cause severe damage to equipment and cables, and possibly represent a hazard for electrocution and/or ignition for any interconnected public utility customers. Additionally, because the multi-grounded neutral can carry a significant fraction of the fault current, it can induce detrimental common-mode voltages in any nearby conductor.

The main threat to the public is through the multi-grounded neutral interconnection. The source of the problem is the possibility that a large GPR can occur as a result of a power fault on the high-voltage transmission line. The magnitude of GPR and the corresponding voltage gradient established around a high-voltage transmission structure depends primarily on the grounding resistance of the transmission structure and the electrical impedance of the overhead-grounding conductors that are usually installed on these high voltage system. In a worst case scenario, substantially all voltage rise produced by a fault at a transmission tower could be transmitted to ground at the tower and propagated throughout the distribution network by the multi-grounded neutral line.

Therefore, there exists a critical need for isolating the neutral and ground lines of PCS cell sites located adjacent to high-voltage transmission towers from the neutral and ground of the electrical power grid servicing the site. This invention is directed at fulfilling this need.

BRIEF SUMMARY OF THE INVENTION

The general objective of this invention is to prevent a high ground potential rise due to a ground fault on a high voltage transmission structure to be carried over to the distribution system through the interconnected multi-grounded neutral which normally exist between PCS cell sites and the low voltage distribution systems that energize them.

It is therefore a specific objective of this invention to provide electrical isolation to the multi-grounded neutral that feeds secondary low-voltage power from a public electric utility system to a PCS cell site located on a high voltage transmission structure.

Another objective of the invention is an isolation system that can be implemented within conventional power distribution parameters and regulatory constraints.

Still another objective is a method and apparatus that are suitable for incorporation with existing equipment.

A final objective is a system that can be implemented easily and economically according to the above stated criteria.

Therefore, according to these and other objectives, the multi-grounded neutral electrical isolation system of this invention consists of two standard distribution transformers separated by a distance greater than the zone of influence corresponding to the maximum expected ground potential rise at the PCS cell site. The primary winding of the first transformer is connected to the utility's low-voltage distribution system and is grounded through the network's ground. The secondary winding is connected to the primary winding of the second transformer through a high-voltage non-shielded insulated conductor and the frames of the two transformers are kept electrically and physically isolated. The secondary winding of the second transformer energizes the PCS cell site and shares its ground connection, which is also common to the adjacent high-voltage transmission tower. All neutrals are grounded through their respective grounding systems. Finally, the second transformer is selected with a basic insulation level (BIL) rating sufficient to withstand the maximum ground potential rise expected to occur at the cell site as a result of a fault or a lightening discharge at the high-voltage transmission tower. Thus, by separating the two transformers by a distance at least equal to the zone of influence corresponding to such a GPR, the isolation of the distribution grid from the cell site is ensured.

Moreover, the BIL rating of the second transformer protects the transmission grid from a sudden potential rise due to a fault in the transformer's insulation. Obviously, such rating of the transformer is judiciously selected to provide the desired level of protection.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention lies in the recognition that the potential problem of a sudden ground potential rise spreading to a distribution network from a personal-communication-system cell site erected in the vicinity of a high-voltage transmission tower can be corrected by decoupling their grounding systems. This can be achieved rather economically with conventional equipment by exploiting the electrical separation existing between primary and secondary windings of a transformer and the built-in basic insulation level provided through conventional manufacture, which can be used advantageously to ensure isolation of the primary winding under the effect of any predetermined voltage rise applied to the secondary winding through its ground connection.

Figure 1:
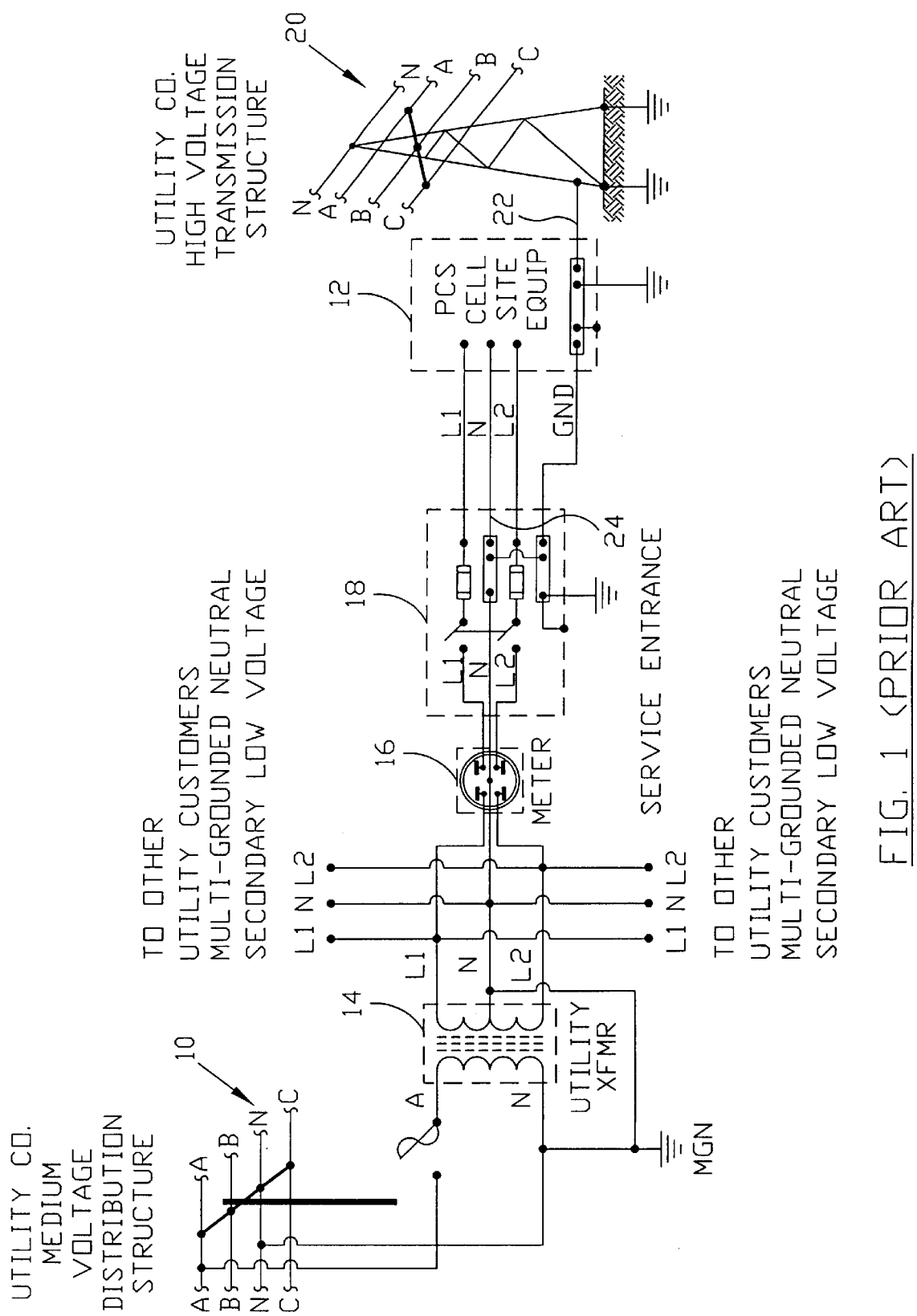
FIG. 1 is a schematic diagram of a typical prior-art connection of PCS cell site equipment located adjacent to a high-voltage transmission tower to the local electric utility's secondary low voltage power service.
Figure 2:
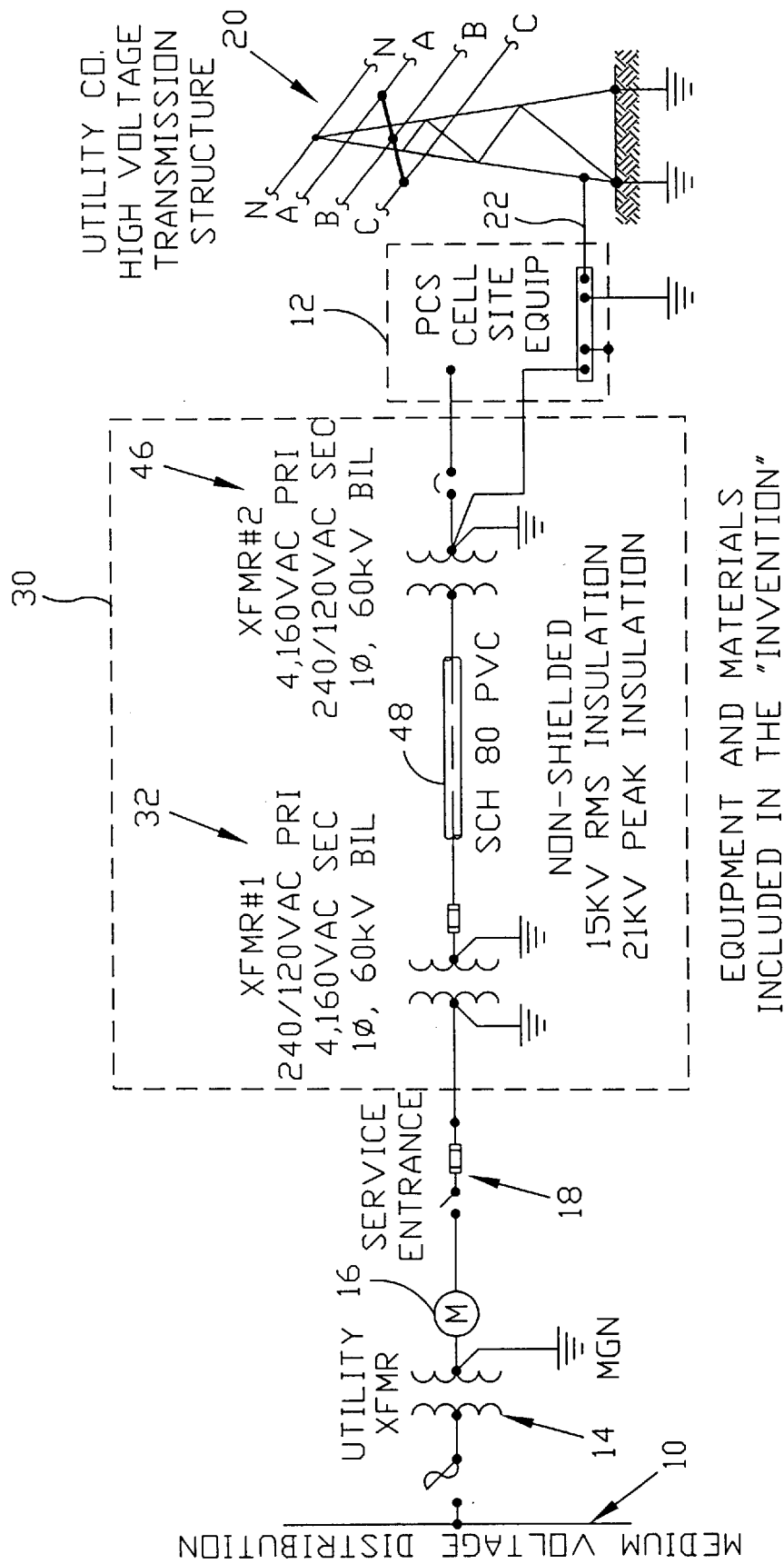
FIG. 2 is a one-line diagram showing the multi-grounded neutral electrical isolation of the invention between PCS cell site equipment located on a high-voltage transmission structure and the local electric utility's secondary low voltage power service.
Figure 3:
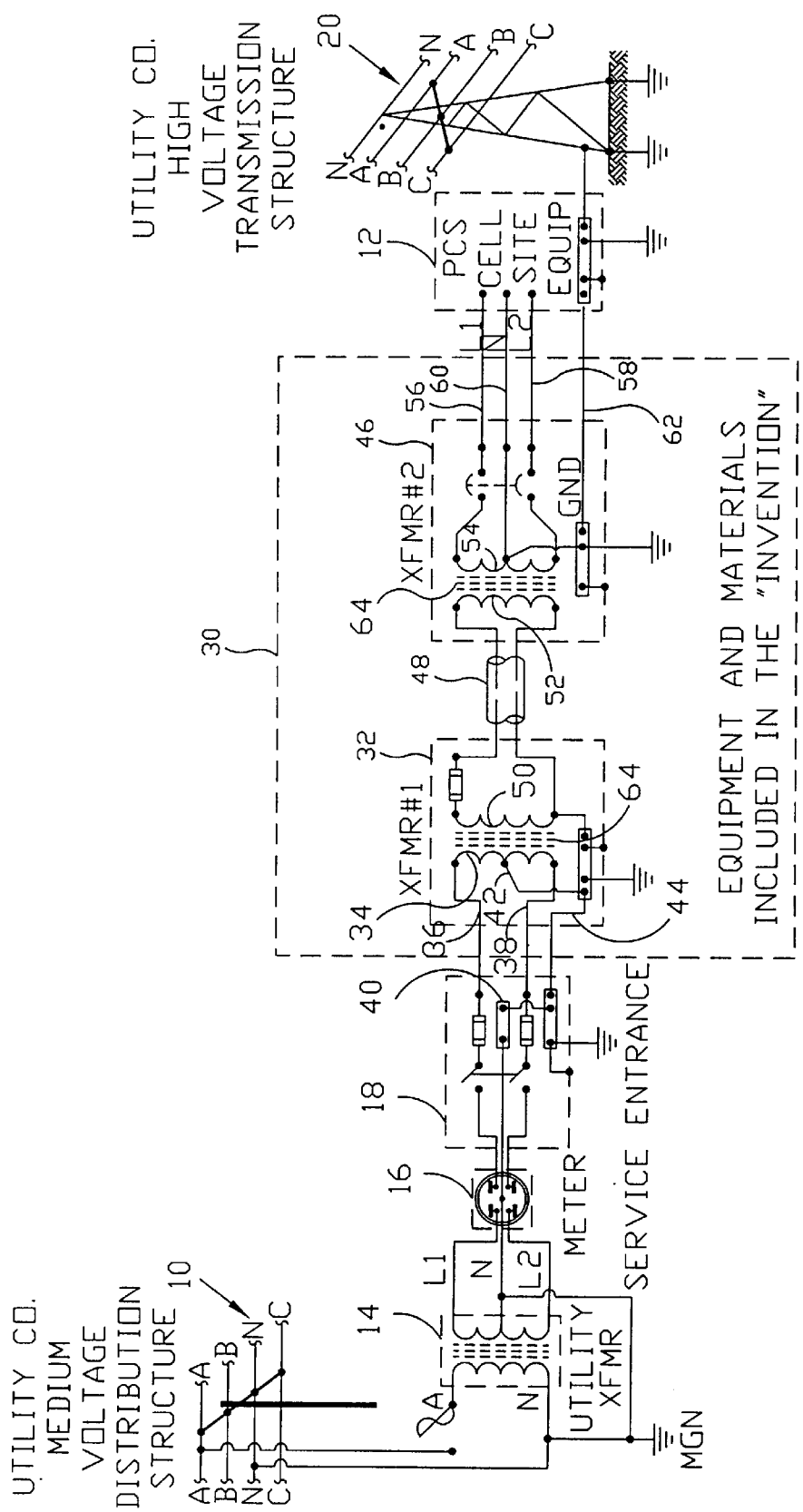
FIG. 3 is a more detailed connection diagram of the multi-grounded neutral electrical isolation system of FIG. 1.

Referring to the drawings, wherein like parts are designated throughout with like numerals and symbols, FIGS. 2 and 3 illustrate in one-line and connection diagrams, respectively, of the preferred embodiment of an isolation system 30 according to the invention. The isolation system is shown coupled to the distribution grid and the PCS cell site described in FIG. 1.

The isolation system 30 is preferably inserted between the service entrance box 18 and the cell site 12 and includes two transformers separated by a distance at least equal to the maximum zone of influence expected from a worst-case ground potential rise at the high-voltage transmission tower 20. For example, if the tower carries a high-voltage transmission line of 20,000 volts, the zone of influence of such a discharge to ground can be calculated using well known electrical theory and the two transformers are separated accordingly. Although the concept is clear in the art, as used herein "zone of influence" is defined as the maximum radius of propagation of a voltage applied to a particular location in the ground; that is, the distance in any direction from that location beyond which no voltage rise is experienced because of the ground's impedance. Obviously, the zone of influence is a function of the ground's characteristics, such as composition, moisture, etcetera.

The first transformer 32, labeled service transformer for convenience of description, is connected to the utility low-voltage network in conventional manner. Thus, the primary winding 34 of transformer 32 is connected to the two line wires 36,38 and to the neutral wire 40 provided by the utility company. The primary's neutral wire 42 and the transformer's frame are grounded and a ground wire 44 that is common to the service-entrance box 18 and the service transformer 32 merges the transformer's neutral and ground with the utility's multi-grounded neutral of the secondary low-voltage distribution system.

A second transformer 46, labeled user transformer for convenience of description, is connected to the service transformer 32 by means of an insulated cable 48 coupling the service transformer's secondary winding 50 with the user transformer's primary winding 52. As explained above, transformers 32 and 46 are separated by a distance at least as large as the zone of influence corresponding to the maximum ground potential rise expected at the location of the tower 20 in a worst-case ground-fault situation. The cable 48 should be encased in an insulator, such as dielectric polyvinyl chloride (PVC) piping, in order to prevent electrical connection between the frames of the two transformers in any case. The invention is predicated upon the ability to maintain such complete isolation of all above-ground facilities separated by a distance at least equal to a predetermined zone of influence.

The user transformer 46, which is typically placed next to the transmission tower 20 in order to utilize its structure as a support for the antenna of the cell site 12, is also connected to the cell site in conventional manner. The secondary winding 54 of transformer 46 is connected to the two "load" wires 56,58 and to the neutral wire 60 of the PCS cell site. The secondary's neutral wire 60 and the transformer's frame are grounded and a ground wire 62 that is common to the frames of the user transformer 46 and the cell site 12 provides an isolated ground for the transformer/cell-site equipment. Since, as well understood in the art, safety considerations dictate that the cell site 12 and the tower 20 also share a ground connection, the tower is also isolated from the utility's multi-grounded neutral network.

It is readily apparent that a fault causing a sudden discharge to ground and a corresponding ground potential rise at the location of the tower 20 could not affect the utility network through ground because of the maximum zone-of-influence separation. The only way such a rapid voltage rise could propagate to the network would be through a breakdown of the insulation 64 between the secondary winding 54 and primary winding 52 of the user transformer 46. Therefore, this transformer must be selected with a basic insulation level (BIL) rating sufficient to prevent its breakdown under the worst ground-potential-rise case. Since transformer BIL ratings are directly related to the voltage difference between the primary and secondary circuits, the insulation requirement of the invention can be met easily by a judicious choice of transformers 32,46.

Thus, the service transformer 32 is selected as a step-up unit to a voltage sufficiently high to guarantee that the BIL rating of the corresponding step-down transformer 46 will be sufficient to maintain the isolation of its secondary winding 54 under the worst-case breakdown. It is noted that the insulation 66 between the secondary winding 50 and the primary winding 34 of the service transformer 32 provides additional electrical isolation of the cell site from the utility network.

For example, PCS cell sites are commonly placed adjacent to towers supporting high-voltage transmission cables operating above 15,000 volts. Selecting this voltage as the maximum ground potential rise to which the system may be subjected, the invention can be implemented by using two single-phase, 10 kVA, 4,160V-240/120 V, 60kV BIL, transformers 32,46. These transformers are electrically interconnected as shown in the figures with two non-shielded 15 kV RMS insulated conductors 48 encased in a PVC conduit. These conductors need to be non-shielded to ensure that no shielding exist that could accidentally provide a galvanic connection between the two transformers. Additionally, the transformers 32 and 46 are physically separated in such a way as to ensure that the multi-grounded neutral from the service-entrance equipment 40 is not subject to the zone of influence of a ground potential rise of 20 kV occurring at the location of the tower 20 adjacent to the PCS cell site 12. The zone of influence of such a GPR is typically 10 to 30 meters. This interconnection ensures that no grounded neutral connection exists between the service entrance equipment 18 and the PCS cell site 12, thereby eliminating the ground path to the network's multi-grounded neutral for ground fault current from the high voltage structure. In case of a breakdown of the high-voltage transmission line at the tower 10, such that a 20 kV surge voltage is applied to the grounded neutral of the transformer 46 and to the grounding bus of the cell site 12, such voltage is not transferred to the grounding bus of the service-entrance equipment 18 because the distance between these two grounding systems is chosen so as to remove their influence from one another. The transformer 46 prevents the surge from propagating through the cable 48. In addition, the transformer 32 further isolates the utility end of the system from such a high-voltage surge by providing a second galvanic decoupling through its insulation 64.

As a result of the isolation system of the invention, a high GPR due to a fault on a high-voltage transmission structure is prevented from being carried over to the distribution system through the interconnected multi-grounded neutral network that normally exists between all energized units. Thus, this neutral electrical isolation circuit provides protection to equipment and persons that are served by the electric power utility in the event that a fault to ground occurs on a PCS cell site located on a high-voltage structure.

Various changes in the details, steps and components that have been described may be made by those skilled in the art within the principles and scope of the invention herein illustrated and defined in the appended claims. Therefore, while the present invention has been shown and described in what is believed to be the most practical and preferred embodiment, it is recognized that departures can be made therefrom within the scope of the invention, which is not to be limited to the details disclosed herein but is to be accorded the full scope of the claims so as to embrace any and all equivalent circuits and products.

We claim:

1. A device for isolating a multi-grounded neutral line in an electric power distribution network from a power-user site connected to a ground subject to an expected maximum ground potential rise having a predetermined zone of influence, comprising the following combination of components:

a service transformer having a primary winding connected to the power distribution network and to said networks's multi-grounded neutral line;

a user transformer having a secondary winding connected to the power-user site; and an insulated electrical connection between a secondary winding of the service transformer and a primary winding of the user transformer;

wherein the service and the user transformers are separated by a distance at least as large as the zone of influence of the expected maximum ground potential rise affecting the ground connected to the power-user site, and wherein the user transformer has a basic-insulation-level rating capable of withstanding said ground potential rise.

2. The device of claim 1, wherein said power-user site is a personal-communication-system cell site sharing a common ground with a high-voltage transmission tower.

3. The device of claim 1, wherein said service and user transformers consist of two units with substantially equal electrical characteristics.

4. The device of claim 2, wherein said service-and user transformers consist of two units with substantially equal electrical characteristics.

5. The device of claim 1, wherein said insulated electrical connection between a secondary winding of the service transformer and a primary winding of the user transformer is encased in dielectric material.

6. The device of claim 5, wherein said dielectric material consists of polyvinyl chloride tubing.

7. The device of claim 3, wherein said insulated electrical connection between a secondary winding of the service transformer and a primary winding of the user transformer is encased in dielectric material.

8. The device of claim 2, wherein said expected maximum ground potential rise is 20,000 volts, said service and user transformers have a basic insulation level of 60,000 volts and are separated by a distance of at least 10 meters.

9. The device of claim 8, wherein said insulated electrical connection between a secondary winding of the service transformer and a primary winding of the user transformer is encased in dielectric material.

10. The device of claim 9, wherein said dielectric material consists of polyvinyl chloride tubing.

11. A method for isolating a multi-grounded neutral line in an electric power distribution network from a power-user site connected to a ground subject to an expected maximum ground potential rise having a predetermined zone of influence, comprising the following steps:

connecting a primary winding of a service transformer to the power distribution network and to said networks's multi-grounded neutral line;

connecting a secondary winding of a user transformer having to the power-user site; and connecting an insulated electrical cable between a secondary winding of the service transformer and a primary winding of the user transformer;

wherein the service and the user transformers are separated by a distance at least as large as the zone of influence of the expected maximum ground potential rise affecting the ground connected to the power-user site, and wherein the user transformer has a basic-insulation-level rating capable of withstanding said ground potential rise.

12. The method of claim 11, wherein said power-user site is a personal-communication-system cell site sharing a common ground with a high-voltage transmission tower.

13. The method of claim 11, wherein said service and user transformers consist of two units with substantially equal electrical characteristics.

14. The method of claim 12, wherein said service and user transformers consist of two units with substantially equal electrical characteristics.

15. The method of claim 11, wherein said insulated electrical connection between a secondary winding of the service transformer and a primary winding of the user transformer is encased in dielectric material.

16. The method of claim 15, wherein said dielectric material consists of polyvinyl chloride tubing.

17. The method of claim 13, wherein said insulated electrical connection between a secondary winding of the service transformer and a primary winding of the user transformer is encased in dielectric material.

18. The method of claim 12, wherein said expected maximum ground potential rise is 20,000 volts, and said service and user transformers have a basic insulation level of 60,000 volts and are separated by a distance of at least 10 meters.

19. The method of claim 18, wherein said insulated electrical connection between a secondary winding of the service transformer and a primary winding of the user transformer is encased in dielectric material.

20. The method of claim 19, wherein said dielectric material consists of polyvinyl chloride tubing.

\* \* \* \* \*